United States Patent
Jung et al.

(10) Patent No.: US 8,027,099 B2
(45) Date of Patent: Sep. 27, 2011

(54) OPTICAL SYSTEM FOR CAMERA

(75) Inventors: Phil Ho Jung, Suwon-si (KR); Moon Do Yi, Goyang-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 12/662,339

(22) Filed: Apr. 12, 2010

(65) Prior Publication Data

US 2011/0134543 A1     Jun. 9, 2011

(30) Foreign Application Priority Data

Dec. 8, 2009  (KR) .................. 10-2009-0121404

(51) Int. Cl.
*G02B 13/18* (2006.01)
*G02B 3/02* (2006.01)
*G02B 9/34* (2006.01)
(52) U.S. Cl. ........................ 359/715; 359/781
(58) Field of Classification Search .............. 359/715, 359/781

See application file for complete search history.

(56) References Cited

U.S. PATENT DOCUMENTS

2007/0183062 A1 * 8/2007 Nakamura ............... 359/781

FOREIGN PATENT DOCUMENTS

JP     2006-292988     10/2006

* cited by examiner

*Primary Examiner* — Alicia M Harrington (57) ABSTRACT

The present invention provides an optical system for a camera including: a first lens which has a negative refractive power and has a meniscus shape convex toward object side; a second lens which has a negative refractive power and has a convex surface toward object side; a third lens which has a positive refractive power and has a convex surface toward object side; and a fourth lens which has a positive refractive power and has a convex surface toward image side, wherein the optical system satisfies the following inequalities: $0.3<v3/v2<0.8$, and $0.06<f1/TL/0.2$, where v2 indicates an Abbe number of the second lens, v2 indicates an Abbe number of the third lens, f1 indicates the overall focal distance of lens system, and TL indicates a distance from a vertex of the object side of the first lens to an imaged plane.

10 Claims, 6 Drawing Sheets

OPTICAL SYSTEM FOR CAMERA

CROSS-REFERENCE TO RELATED APPLICATIONS

This application claims the benefit of Korean Patent Application No. 10-2009-0121404 filed with the Korea Intellectual Property Office on Dec. 8, 2009, the disclosure of which is incorporated herein by reference.

BACKGROUND OF THE INVENTION

1. Field of the Invention

The present invention relates to an optical system for a camera; and, more particularly, to an optical system for a camera in which a wide-angle of view can be implemented by using the number of lenses as small as possible and inter-compensation can be achieved with respect to contraction and expansion of plastic lenses caused by external temperature.

2. Description of the Related Art

In recent, a mobile communication means (e.g., mobile communication terminal, PDA, and smart phone) has a tendency toward increase in its use and diversification of services provided through communication technologies. In line with this, the mobile communication means has incorporated additional functions in various types, in addition to basic communication functions. A camera function of the additional functions is most frequently mounted on a mobile communication means.

Such a camera becomes gradually small and thin with the miniaturization of camera-mounted devices. In particular, with the gradually increased use of a front/rear monitoring camera for an automobile or of a CCTV for external monitoring, an optical system of a wide-angle of view has been demanded which has a compact size and provides image information in wide ranges.

An optical system of a wide-angle of view should be used as an optical system for external monitoring or rear monitoring, because such a monitoring optical system should take a picture from the outside in wide ranges. Additionally, an optical system should be designed to be light enough to identify a subject even in a dark environment.

Optimal conditions for design of the light optical system are to use glass lenses with spherical surfaces which have superior optical transmittance and refractive indexes. However, it is difficult to design compact and inexpensive optical system in consideration of cost for manufacturing a monitoring camera.

Therefore, in an optical system mounted on a monitoring camera, plastic lenses advantageous for molding should be used and the number of the lenses should be as small as possible, in order to achieve miniaturization and reduction in its price. However, an optical system designed in the prior art fails to satisfy the optimal conditions, because plastic lenses with lower optical performance are used in the optical system. Moreover, reduction in the number of lenses decreases the degree of freedom in design of optical systems.

Meanwhile, at the time of designing an optical system of a wide-angle of view in the prior art, lenses of eight or more are generally necessary and the entire length of the optical system has no choice but to be elongated. That is, in the prior art, it is difficult to satisfy conditions of miniaturization and competitive cost.

SUMMARY OF THE INVENTION

The present invention has been proposed in order to overcome the above-described problems and it is, therefore, an object of the present invention to provide an optical system for a camera in which plastic lenses with positive/negative refractive powers are alternatively disposed in order to inter-compensate for contraction and expansion caused by high/low external temperatures, so that it is possible to realize a wide-angle of view even through the number of lenses as small as possible (e.g. four lenses).

In accordance with one aspect of the present invention to achieve the object, there is provided an optical system for a camera including: a first lens which has a negative refractive power and has a meniscus shape convex toward object side; a second lens which has a negative refractive power and has a convex surface toward object side; a third lens which has a positive refractive power and has a convex surface toward object side; and a fourth lens which has a positive refractive power and has a convex surface toward image side, wherein the optical system satisfies the following inequalities: $0.3 < v3/v2 < 0.8$, and $0.06 < f1/TL/0.2$, where v2 indicates an Abbe number of the second lens, v2 indicates an Abbe number of the third lens, f1 indicates the overall focal distance of lens system, and TL indicates a distance from a vertex of the object side of the first lens to an imaged plane.

In this case, the second lens has a meniscus shape which is concave toward the image side.

Preferably, any one of the first and second lenses has one aspherical surface, and the fourth lens has one of both surfaces which includes at least one aspherical surface.

Preferably, the second and fourth lenses are formed as plastic lenses with one aspherical surface.

Also, an aperture stop for blocking unnecessary rays of light passing through the optical system is interposed between the third and fourth lenses.

The optical system further includes an optical filter of cover glasses coated with infrared filters which block excessive infrared rays of light introduced from the outside, wherein the optical filter is interposed between the fourth lens and the imaged plane.

Meanwhile, a measure of an optical axis direction and a radius of curvature of the second lens satisfy the following inequalities: $0.1 < R4/R3 < 0.4$, $-2.1 < fp/fm < -0.70$, and $1.5 \le f1/f2 < 3.8$, where R3 indicates a radius of curvature in the image side of the second lens, R4 indicates a radius of curvature in the object side of the second lens, fp indicates a focal distance of a lens which has an aspherical surface and has a positive refractive power, fm indicates a focal distance of a lens which has an aspherical surface and has a negative refractive power, f1 indicates a focal distance of the first lens, and f2 indicates a focal distance of the second lens.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Embodiments of an optical system for a camera in accordance with the present invention will be described in detail with reference to the accompanying drawings. When describing them with reference to the drawings, the same or corresponding component is represented by the same reference numeral and repeated description thereof will be omitted.

The size, thickness, and shapes of lenses may be exaggerated in the drawings of embodiments for clarity. In particular, shapes of aspherical/spherical surfaces in the lenses are merely presented as one example, and the present invention is not limited to these shapes.

Figure 1:
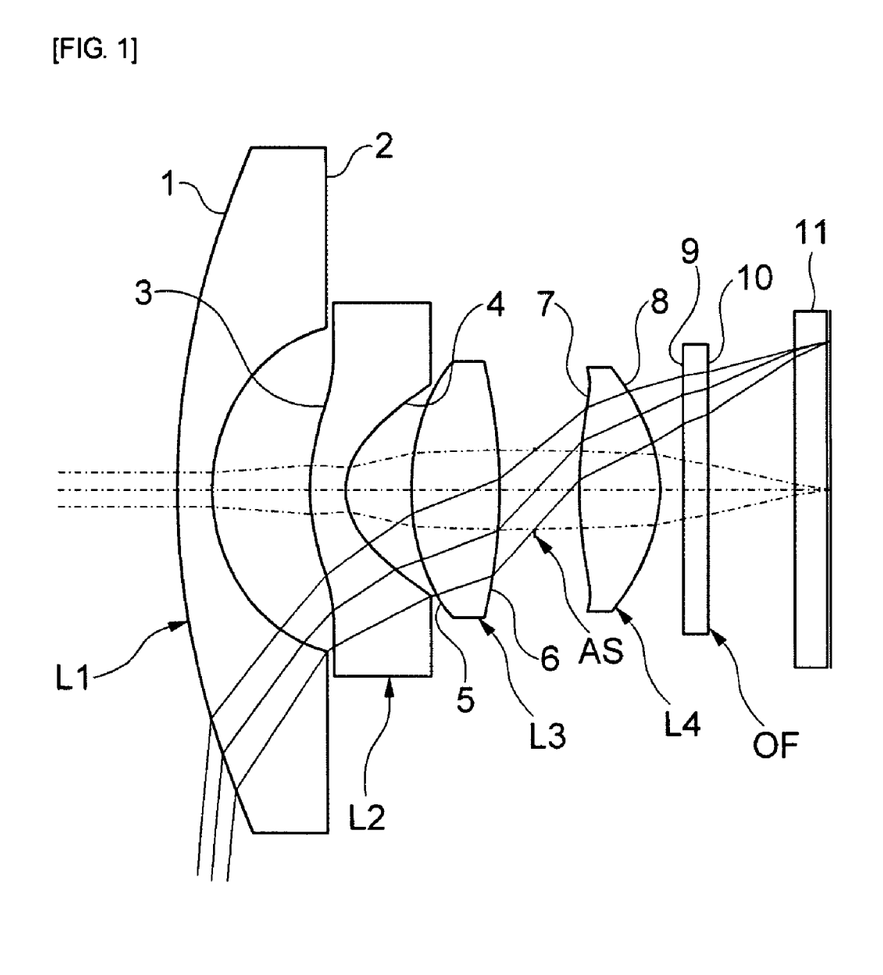
FIG. 1 is a view showing an arrangement of lenses in an optical system for a camera in accordance with a first embodiment of the present invention.

FIG. 1 is a view showing an arrangement of lenses in an optical system for a camera in accordance with a first embodiment of the present invention. As shown in FIG. 1, the optical system for the camera in accordance with the first embodiment of the present invention may include a first lens L1, a second lens L2, a third lens L3, and a fourth lens 4 which are sequentially disposed in order from the object side. The first lens L1 has a meniscus shape convex toward the object side and a negative refractive power, and the second lens L2 has a negative refractive power and is convex toward object side. The third lens L3 has a positive refractive power and is convex toward object side and the fourth lens L4 has a positive refractive power and is convex toward image side. Herein, an aperture stop AS may be interposed between the third and fourth lenses L3 and L4.

Also, between the fourth lens L4 and an imaged plane 11, there may be provided an infrared filter for blocking excessive infrared rays of light traveling through an optical system, or an optical filter OF formed with cover glasses coated with infrared filters.

According to the optical system for the camera in the present invention, the AS is positioned behind the third lens L3, that is, between the third lens L3 and the fourth lens L4, thereby obtaining amounts of light with ease and implementing a wide-angle of view through the four lenses.

The second lens L2 may have a meniscus shape which includes one surface convex toward the object side and the other surface concave toward the image side. Alternatively, the second lens L2 may have a biconcave shape which includes two surfaces concave toward the image and object sides.

Preferably, each of the second and fourth lenses L2 and L4 may be plastic lenses which include one surface as an aspherical surface. The second and fourth lenses L2 and L4 may include at least one aspherical surface.

The reason why aspherical-surface lenses are used as at least one of lenses in the optical system is for minimizing the number of lenses to thereby implement a wide-angle of view.

In this case, it is preferred that the optical system is constructed by using glass lenses with a spherical surface which is easy to implement a wide-angle of view, because the optical system mainly mounted on a CCTV, and a vehicle camera should be operated in an environment where external exposure is frequent and temperature is high or low. However, if lenses with the spherical surface are used, the optical system should be provided with at least four glass lenses with the spherical surface, so it is difficult to implement compact and inexpensive optical system.

Therefore, the description in the present invention will center around a technology where one or more lenses within the optical system (preferably, two lenses) are formed as plastic lenses with aspherical surfaces to thereby implement a wide-angle of view only through the number of lenses as small as possible.

Meanwhile, the optical system of the present invention includes the second lens L2 and the fourth lens L4 each of which is formed as a plastic lens with an aspherical surface. Alternatively, the optical system of the present invention includes the second lens L2 and the fourth lens L4 each of which has at least one aspherical surface.

In this case, one side of the first lens L1 may have an aspherical surface in front of the second lens L2.

In this case, the second and fourth lenses L2 and L4 with aspherical surfaces (that is, plastic lenses) which are applied to the optical system of the present invention are mainly employed in a monitoring camera or front/rear sensing camera for an automobile. For this reason, they may be susceptible of external temperature and thus may be either contracted or expanded. Therefore, the optical system of the present invention should be designed in consideration of conditions of contraction and expansion of the plastic lenses employed therein. Thus, preferably, plastic lenses with the aspherical surface are alternatively disposed, wherein the plastic lenses have refractive powers different from one another, (i.e., refractive powers opposite to one another), contraction similar to one another, and expansion variations.

Also, the optical system of the present invention has the second lens which corresponds to a lens with a low refractive index n and a high Abbe number, and the third lens which corresponds to a lens with a high refractive index n and a low Abbe number, which makes it possible to compensate for the overall chromatic aberration of the optical system.

A detailed description will be given of cases where Inequalities (1) to (6) are applied under the optical system with the constructions as described above.

$$0.3 < v3/v2 < 0.8 \quad (1)$$

In Inequality (1), v2 indicates an Abbe number of the second lens, and v3 indicates an Abbe number of the third lens.

Inequality (1) is related to the condition of chromatic aberration in the optical system. When the optical system is greater either than the upper limit or less than the lower limit, focus adjusting locations for each wavelength are different from one another, and thus colors of the photographed image come to spread.

$$0.06 < f1/TL < 0.2 \quad (2)$$

In Inequality (2), f1 indicates a focal distance of the entire lens system, and TL indicates a distance from a vertex of the object side of the first lens to the imaged plane.

Inequality (2), which defines a measure of an optical axis direction of the entire optical system, is related to the condition for miniaturizing the optical system by the ratio of the focal distance and the measure of the entire optical system, that is, compact optical system.

That is, when the optical system is less than the lower limit defined in Inequality (2), the length of the optical system is elongated and thus it is impossible to implement a compact optical system. When the optical system is greater than the upper limit, it is possible to achieve a compact optical system, but impossible to construct an optical system capable of implementing a wide-angle of view. Therefore, it is difficult to satisfy optical characteristics required in the present invention.

$$0.1 < R4/R3 < 0 \quad (3)$$

In Inequality (3), R3 indicates a radius of curvature in the image side of the second lens, and R4 indicates a radius of curvature in the object side of the second lens.

Inequality (3) is related to the condition of a corner resolution at a wide-angle of view. When the optical system is either greater than the upper limit or less than the lower limit, the length of the optical system is elongated as in Inequality (2) and thus it is difficult to ensure resolution performance at a wide-angle of view.

$$-2.1 < fp/fm < -0.70 \quad (4)$$

In Inequality (4), fp indicates a focal distance of a lens which has an aspherical surface and a positive refractive power, and fm indicates a focal distance of a lens which has an aspherical surface and a negative refractive power.

Inequality (4) is related to the condition of balancing of the refractive powers between plastic lenses with aspherical surfaces which are alternatively disposed at the optical system of the present invention. When the optical system is either greater than the upper limit or less than the lower limit, a lens with a positive refractive power and a lens with a negative refractive power are imbalanced with respect to refractive powers therebetween. Therefore, moving amount is excessively increased at the time of change of the external temperature, so resolution performance at a fixed focus may be reduced.

$$1.5 < f1/f2 < 3.8 \quad (5)$$

In Inequality (5), f1 indicates a focal distance of the first lens, and f2 indicates a focal distance of the second lens. Inequality (5) is related to the condition of a power ratio between focal distances of the first and second lenses which are disposed at the object side of the optical system of the present invention. When the optical system is less than the lower limit, the refractive power of the first lens is increased, but curvature of the first lens is reduced and thus it is difficult to manufacture an optical system. When the optical system is greater than the upper limit, the refractive power of the second lens is increased, but the second lens is too minimized to manufacture its curvature, and thus it is difficult to construct an optical system.

Hereinafter, a detailed description will be given of the optical system in the present invention through exemplary embodiments with numeric values.

Optical systems in the following first to third embodiments will be described with the same constructions as described above which include a first lens L1, a second lens L2, a third lens L3, and a fourth lens L4, which are disposed sequentially in order from the object. The first lens has a meniscus shape convex toward object side and a negative refractive power, and the second lens L2 has a negative refractive power and is convex toward object side. The third lens L3 has a positive refractive power and is convex toward object side, and the fourth lens L4 has a positive refractive power and is convex toward image side. Herein, an aperture stop AS may be interposed between the third and fourth lenses L3 and L4.

The second lens L2 may have a meniscus shape which includes one surface convex toward the object side and the other surface concave toward the image side. Alternatively, the second lens L2 may have a biconcave shape with both surfaces concave toward the object and image sides.

Moreover, preferably, plastic lenses with one aspherical surface are used as the second and fourth lenses L2 and L4. Furthermore, any one surface of the second and fourth lenses L2 and L4 may be an aspherical surface.

Meanwhile, the aspherical surface used in each of the following embodiments is obtained by Equation (1). Tables 2 to 6 show conic constant k and aspherical coefficients A, B, C, D, E, and F, wherein 'E and Arabic numerals subsequent thereto' represent an exponentiation of ten. For example, E+02 represents $10^2$ and E-02 represents $10^{-2}$.

$$Z = \frac{cY^2}{1 + \sqrt{1 - (1+K)c^2Y^2}} + AY^4 + BY^6 + CY^8 + DY^{10} + EY^{12} + FY^{14} + \ldots \quad (1)$$

In Equation (1), Z indicates a distance in the direction from a vertex of a lens to an optical axis, and Y indicates a distance in the direction that is perpendicular to the optical axis. c indicates an inverse number of the radius of curvature r at a vertex of a lens, and K indicates a conic constant. Each of A, B, C, D, E and F indicates an aspherical coefficient.

First Embodiment

Figure 2:
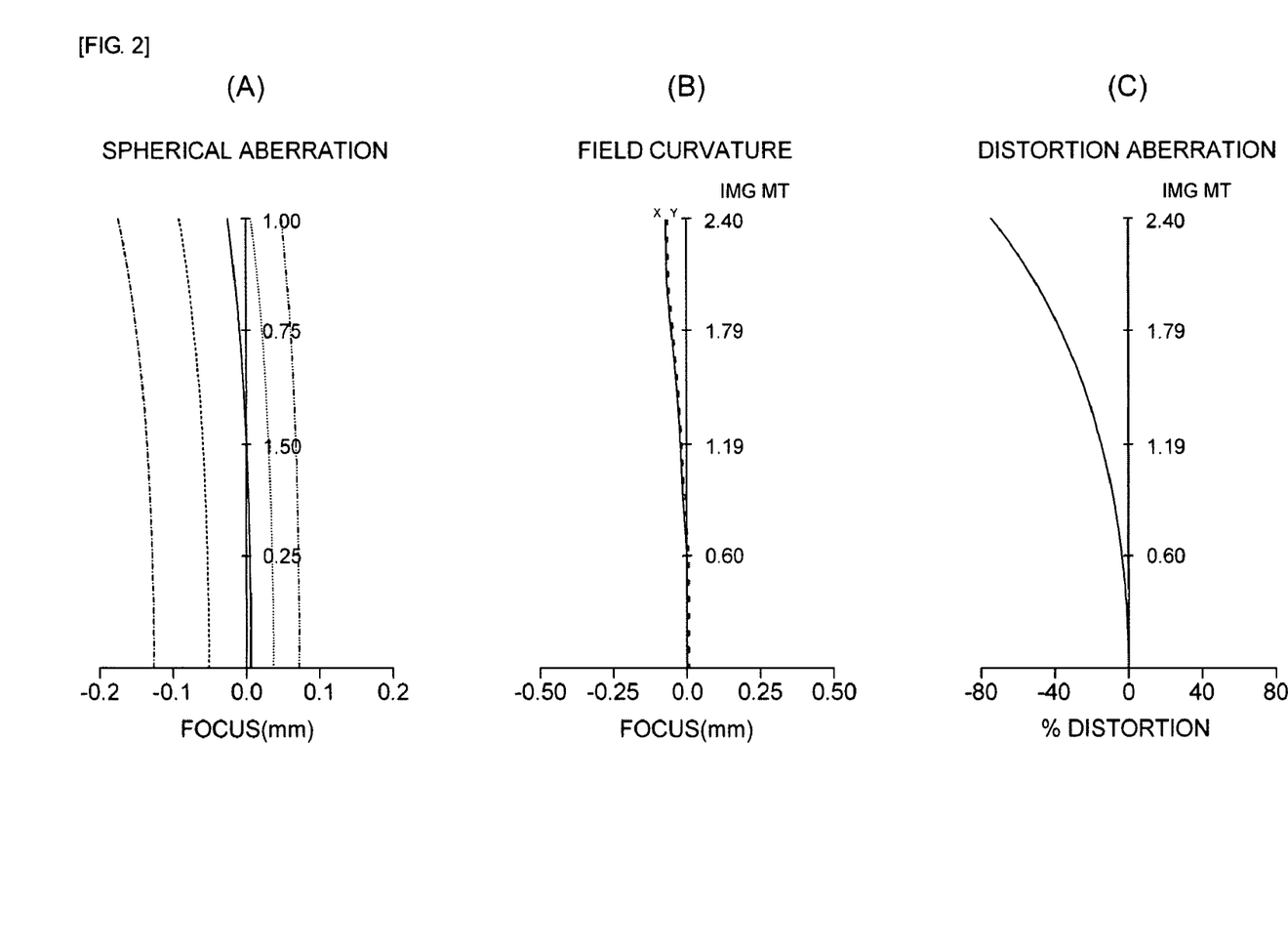
FIGS. 2A to 2C are graphs showing spherical aberration and distortion aberration of the optical system shown in FIG. 1 and Table 1, respectively.

The following Table 1 shows numeric values in the first embodiment of the present invention. Also, FIG. 1 is a view showing an arrangement of lenses in the optical system for the camera in accordance with the first embodiment of the present invention. FIGS. 2A to 2C are graphs showing spherical aberration and distortion aberration of the optical system shown in FIG. 1 and Table 1, respectively.

The first embodiment will be described with the assumption that an angle of view is 170°, a distance TL from a surface 1 in the object side of the first lens L1 to the imaged plane is 11.34 mm, and the overall effective focal distance f of the optical system is 1.45 mm. Moreover, plastic lenses with an aspherical surface are used as the second and fourth lenses L2 and L4. Furthermore, focal distances f1 to f4 for lenses employed in the first embodiment are −6.024, −3.099, 3.225, and 3.022, respectively.

TABLE 1

| No. surface | Radius of curvature (R) | Thickness or Distance (t) | Refractive index (n) | Abbe number (v) | Remark |
|---|---|---|---|---|---|
| 1 | 13.637 | 0.60 | 1.61 | 63.4 | 1st lens |
| 2 | 2.884 | 1.67 | | | |
| *3 | 3.291 | 0.60 | 1.53 | 55.7 | 2nd lens |
| *4 | 1.035 | 1.39 | | | |
| 5 | 3.634 | 1.50 | 1.84 | 23.8 | 3rd lens |
| 6 | −9.257 | 0.60 | | | |
| *7 | 5.103 | 1.36 | 1.53 | 55.7 | 4th lens |
| *8 | −2.156 | 0.40 | | | |
| 9 | Infinity | 0.40 | 1.51 | 64.2 | Optical |
| 10 | Infinity | 1.50 | | | |

In Table 1, the mark (*) added in front of a surface number represents an aspherical surface. In the case of the first embodiment, both surfaces of the second and fourth lenses L2 and L4 include aspherical surfaces. Also, value of aspherical coefficients of surface numbers obtained by Equation (1) are defined as the following Table 2.

TABLE 2

| No. surface | K | A | B | C | D |
|---|---|---|---|---|---|
| 3 | −4.5709E+00 | −0.0104E+00 | 0.0005E+00 | 3.2800E−06 | −1.0100E−06 |
| 4 | −1.0119E+00 | 1.3480E−03 | −4.6040E−03 | 1.1250E−03 | −9.3280E−05 |
| 7 | 0.5715E+00 | −1.1260E−02 | 2.0680E−03 | −8.3380E−04 | −5.6650E−06 |
| 8 | 0 | 2.6940E−02 | 2.5550E−03 | −2.5830E−04 | 3.3260E−05 |

Second Embodiment

Figure 3:
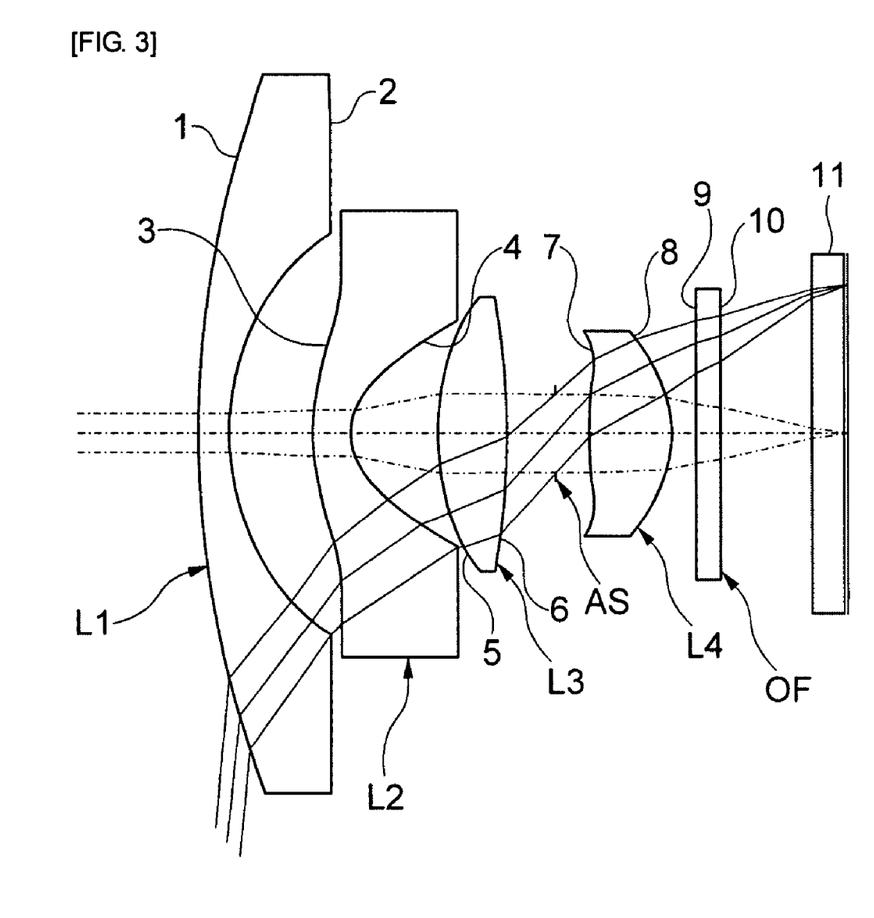
FIG. 3 is a view showing an arrangement of lenses in an optical system for a camera in accordance with a second embodiment of the present invention.
Figure 4:
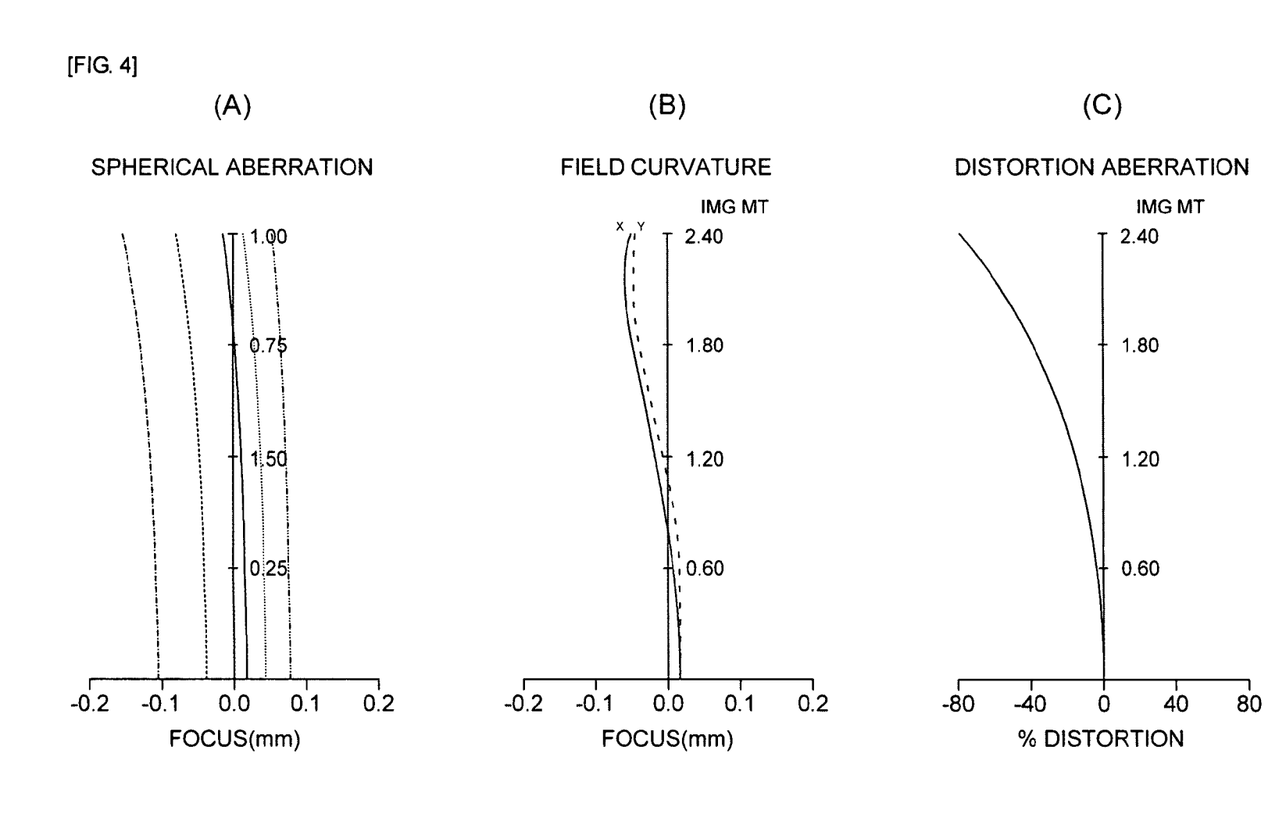
FIGS. 4A to 4C are graphs showing spherical aberration and distortion aberration of the optical system shown in FIG. 3 and Table 3, respectively.

The following Table 3 shows numeric values in the second embodiment of the present invention. Also, FIG. 3 is a view showing an arrangement of lenses in the optical system for the camera in accordance with the second embodiment of the present invention. FIGS. 4A to 4C are graphs showing spherical aberration and distortion aberration of the optical system shown in FIG. 3 and Table 3, respectively.

The second embodiment will be described with the assumption that an angle of view is 170°, a distance TL from a surface 1 in the object side of the first lens L1 to the imaged plane is 10.67 mm, and the overall effective focal distance f of the optical system is 1.45 mm. Moreover, plastic lenses with an aspherical surface are used as the second and fourth lenses L2 and L4. Furthermore, focal distances f1 to f4 for lenses employed in the second embodiment are −6.024, −3.099, 3.225, and 3.022, respectively.

TABLE 3

| No. surface | Radius of curvature (R) | Thickness or Distance (t) | Refractive index (n) | Abbe number (v) | Remark |
|---|---|---|---|---|---|
| 1 | 14.998 | 0.50 | 1.61 | 63.4 | 1$^{st}$ lens |
| 2 | 3.906 | 1.41 | | | |
| *3 | 3.795 | 0.60 | 1.53 | 55.7 | 2$^{nd}$ lens |
| *4 | 1.035 | 1.44 | | | |
| 5 | 3.803 | 1.14 | 1.84 | 23.8 | 3$^{rd}$ lens |
| 6 | −11.618 | 0.79 | | | |
| *7 | 6.109 | 1.37 | 1.53 | 55.7 | 4$^{th}$ lens |
| *8 | −1.933 | 0.40 | | | |
| 9 | Infinity | 0.40 | 1.51 | 64.2 | Optical |
| 10 | Infinity | 1.50 | | | |

In Table 3, the mark (*) added in front of a surface number represents an aspherical surface. In the case of the second embodiment, both surfaces of the second and fourth lenses L2 and L4 include aspherical surfaces. Also, in the second embodiment of the present invention, values of aspherical coefficients of surface numbers obtained by Equation (1) are defined as the following Table 4.

Third Embodiment

Figure 5:
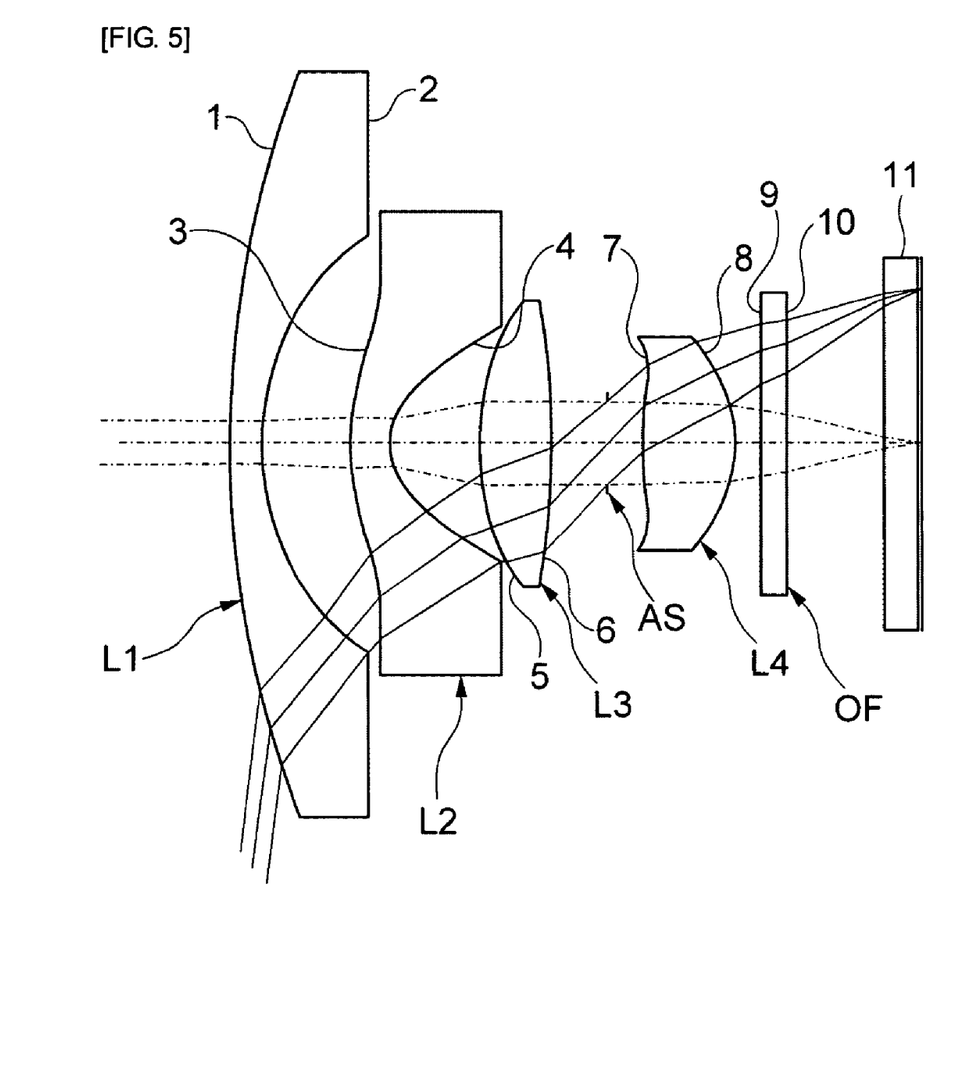
FIG. 5 is a view showing an arrangement of lenses in an optical system for a camera in accordance with a third embodiment of the present invention.
Figure 6:
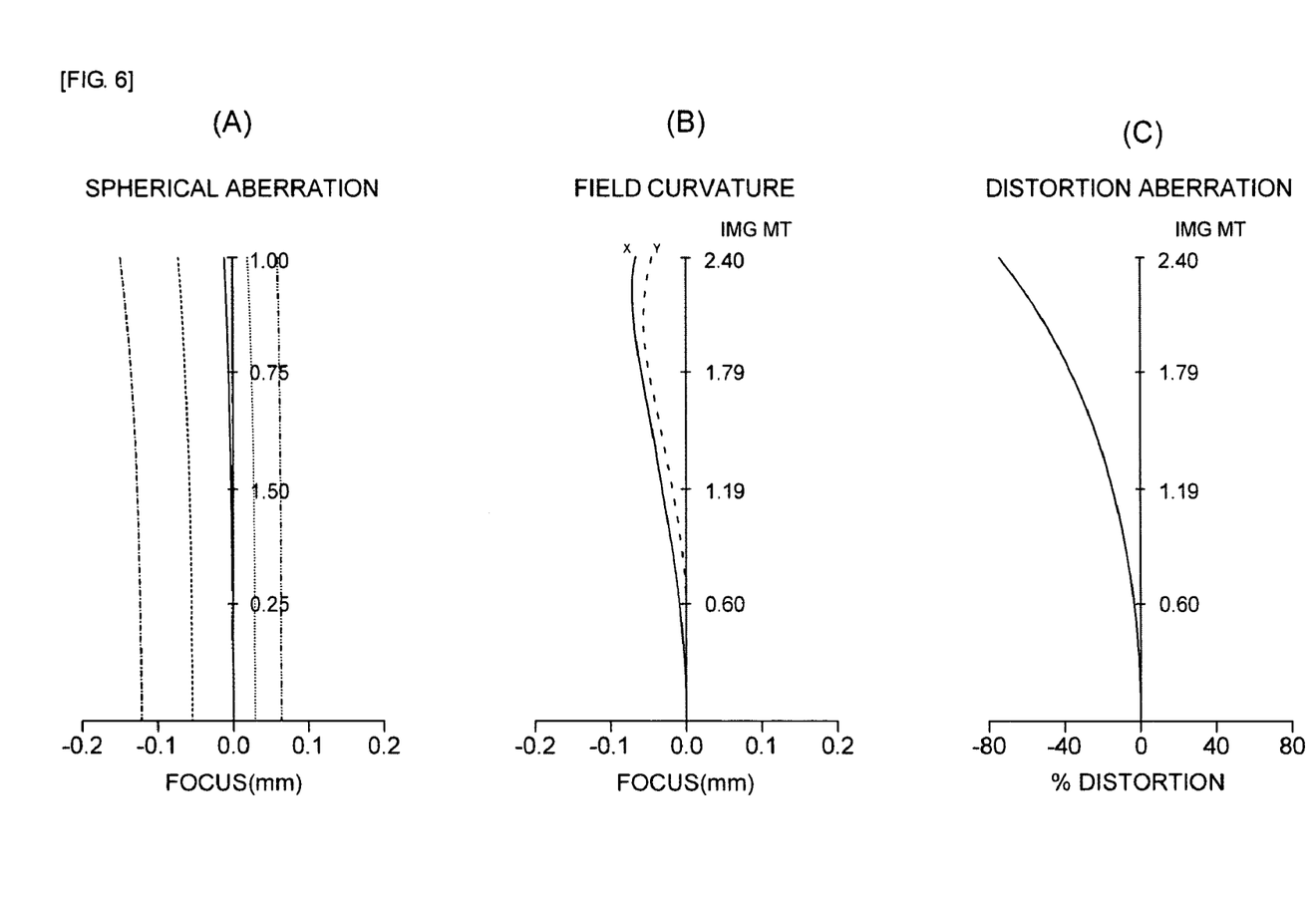
FIGS. 6A to 6C are graphs showing spherical aberration and distortion aberration of the optical system shown in FIG. 5 and Table 5, respectively.

The following Table 5 shows numeric values in the second embodiment of the present invention. Also, FIG. 5 is a view showing an arrangement of lenses in the optical system for the camera in accordance with the third embodiment of the present invention. FIGS. 6A to 6C are graphs showing spherical aberration and distortion aberration of the optical system shown in FIG. 5 and Table 5, respectively.

The third embodiment will be described with the assumption that an angle of view is 170°, a distance TL from a surface 1 in the object side of the first lens L1 to the imaged plane is 10.76 mm, and the overall effective focal distance f of the optical system is 1.48 mm. Moreover, plastic lenses with an aspherical surface are used as the second and fourth lenses L2 and L4.

| No. surface | Radius of curvature (R) | Thickness or Distance (t) | Refractive index (n) | Abbe number (v) | Remark |
|---|---|---|---|---|---|
| 1 | 15.054 | 0.50 | 1.65 | 53.8 | 1$^{st}$ lens |
| 2 | 3.991 | 1.41 | | | |
| *3 | 3.801 | 0.60 | 1.53 | 55.7 | 2$^{nd}$ lens |
| *4 | 1.036 | 1.35 | | | |
| 5 | 3.911 | 1.14 | 1.84 | 23.8 | 3$^{rd}$ lens |
| 6 | −11.452 | 0.84 | | | |
| *7 | 5.884 | 1.42 | 1.53 | 55.7 | 4$^{th}$ lens |
| *8 | −1.956 | 0.40 | | | |
| 9 | Infinity | 0.40 | 1.51 | 64.2 | Optical |
| 10 | Infinity | 1.60 | | | |

In Table 5, the mark (*) added in front of a surface number presents an aspherical surface. In the case of the third embodiment, both surfaces of the second and fourth lenses L2 and L4 include aspherical surfaces. Also, in the third embodiment of the present invention, values of aspherical coefficients of surface numbers obtained by Equation (1) are defined as the following Table 6.

TABLE 4

| No. surface | K | A | B | C | D |
|---|---|---|---|---|---|
| 3 | −5.0845E+00 | −0.0076E+00 | 0.3032E−03 | 7.4100E−06 | −1.0100E−06 |
| 4 | −0.9499E+00 | 8.6470E−03 | −1.5180E−03 | −2.9220E−04 | 1.1680E−04 |
| 8 | −6.5165E+00 | −1.7990E−02 | 1.0470E−03 | −6.6780E−03 | −6.1360E−04 |
| 9 | 0 | 2.6770E−02 | 7.4060E−04 | 4.5340E−04 | −2.7030E−04 |

TABLE 6

| No. surface | K | A | B | C | D |
|---|---|---|---|---|---|
| 3 | −4.9719E+00 | −0.7676E−02 | 0.3003E−03 | 7.7800E−06 | −6.3800E−07 |
| 4 | −0.9483E+00 | 8.3500E−03 | −1.5150E−03 | −3.3750E−04 | 1.2050E−04 |
| 7 | −5.7448E+00 | −1.7610E−02 | 1.2200E−03 | −1.3790E−03 | −6.2410E−04 |
| 8 | 0 | 2.6340E−02 | 4.3040E−04 | 5.4200E−04 | −2.5170E−04 |

Meanwhile, values obtained by Inequalities (1) and (2) in the first to third embodiments of the present invention are defined as the following Table 7.

TABLE 7

| | $1^{st}$ embodiment | $2^{nd}$ embodiment | $3^{rd}$ embodiment |
|---|---|---|---|
| Inequality 1 (v3/v2) | 0.42 | 0.42 | 0.42 |
| Inequality 2 (f1/TL) | 0.12 | 0.13 | 0.13 |

It is clear from Table 7 that the first to third embodiments satisfy Inequalities (1) and (2).

According to the present invention, the optical system for the camera in which four lenses some of which are formed as plastic lenses with different refractive powers are alternatively disposed, thereby implementing a wide-angle of view only through the minimum number of lenses. Therefore, it is possible to construct a compact and inexpensive optical system.

Moreover, in the present invention, plastic lenses with positive/negative refractive powers are alternatively disposed to thereby inter-compensate for conditions of contraction and expansion of plastic lenses, which are caused at the time of exposure at a high external temperature. Therefore, when a wide-angle of view is realized, it is possible to provide superior resolution of images without reduction of optical performance.

As described above, although the preferable embodiments of the present invention have been shown and described, it will be appreciated by those skilled in the art that substitutions, modifications and variations may be made in these embodiments without departing from the principles and spirit of the general inventive concept, the scope of which is defined in the appended claims and their equivalents.

What is claimed is:

1. An optical system for a camera comprising:
   a first lens which has a negative refractive power and has a meniscus shape convex toward an object side;
   a second lens which has a negative refractive power and has a convex surface toward an object side;
   a third lens which has a positive refractive power and has a convex surface toward an object side; and
   a fourth lens which has a positive refractive power and has a convex surface toward an image side,
   the optical system satisfying the following inequalities:

$0.3 < v3/v2 < 0.8$, $0.06 < f1/TL < 0.2$, v2 being an Abbe number of the second lens, v3 being an Abbe number of the third lens, f1 being an overall focal distance of the first through fourth lenses, and TL being a distance from a vertex of the object side of the first lens to an imaged plane,
   a measure of an optical axis direction satisfying the following inequality:

$0.1 < R4/R3 < 0.4$, and

R3 being a radius of curvature in the image side of the second lens, and R4 being a radius of curvature in the object side of the second lens.

2. The optical system of claim 1, wherein the second lens has a meniscus shape which is concave toward the image side.

3. The optical system of claim 1, wherein any one of the first and second lenses corresponds to a plastic lens with an aspherical surface.

4. The optical system of claim 3, wherein the second lens has one of both surfaces which includes an aspherical surface.

5. The optical system of claim 1, wherein the fourth lens has one of both surfaces which includes at least one aspherical surface.

6. The optical system of claim 1, wherein an aperture stop to block unnecessary rays of light passing through the optical system is interposed between the third and fourth lenses.

7. The optical system of claim 1, further comprising an optical filter of cover glasses coated with infrared filters which block excessive infrared rays of light introduced from the outside, wherein the optical filter is interposed between the fourth lens and the imaged plane.

8. The optical system of claim 1, wherein a measure of an optical axis direction satisfies the following inequality:

$-2.1 < fp/fm < -0.70$, where fp indicates a focal distance of a lens which has an aspherical surface and has a positive refractive power, and fm indicates a focal distance of a lens which has an aspherical surface and has a negative refractive power.

9. The optical system of claim 1, wherein a measure of an optical axis direction satisfies the following inequality:

$1.5 < f1/f2 < 3.8$, where f1 indicates a focal distance of the first lens, and f2 indicates a focal distance of the second lens.

10. An optical system for a camera comprising:
    a first lens which has a negative refractive power and has a meniscus shape convex toward an object side;
    a second lens which has a negative refractive power and has a convex surface toward an object side;
    a third lens which has a positive refractive power and has a convex surface toward an object side; and
    a fourth lens which has a positive refractive power and has a convex surface toward an image side,
    the optical system satisfying the following inequalities:

$0.3 < v3/v2 < 0.8$, $0.06 < f1/TL < 0.2$, v2 being an Abbe number of the second lens, v3 being an Abbe number of the third lens, f1 being an overall focal distance of the first through fourth lenses, and TL being a distance from a vertex of the object side of the first lens to an imaged plane,
    a measure of an optical axis direction satisfying the following inequality:

$1.5 < f1/f2 < 3.8$, and f1 being a focal distance of the first lens, and f2 being a focal distance of the second lens.

* * * * *